Sept. 19, 1939.  A. BRENDLIN  2,173,678
HIGH-PRESSURE BELLOWS STRUCTURE
Filed April 30, 1937  3 Sheets-Sheet 1

Adolf Brendlin
INVENTOR

Sept. 19, 1939.  A. BRENDLIN  2,173,678

HIGH-PRESSURE BELLOWS STRUCTURE

Filed April 30, 1937  3 Sheets-Sheet 3

INVENTOR
Adolf Brendlin
BY
HIS ATTORNEYS

Patented Sept. 19, 1939

2,173,678

UNITED STATES PATENT OFFICE 2,173,678

HIGH-PRESSURE BELLOWS STRUCTURE

Adolf Brendlin, Knapsack, Bezirk, Cologne, Germany

Application April 30, 1937, Serial No. 139,840
In Germany January 10, 1936

11 Claims. (Cl. 137—156.5)

The present invention relates to bellows membranes and bellows membrane bodies for a long stroke and a high pressure.

The membrane and their supports that are used in bellows pumps can be adapted for a long stroke but are suitable only for the transmission of comparatively low pressure. Undulatory diaphragms, namely diaphragms composed of thick-walled box shaped members and longitudinally flexible, are resistant to high pressure but do not permit a long stroke because their flexibility is limited by the thickness of the walls.

High pressure bellows pumps having a long stroke have not hitherto been attainable.

I have found that the bellows membranes and their supports according to this invention are adapted to resist high pressure and when used in a bellows pump, to be capable of a long stroke. They are also suitable for other purposes in which resistance to high pressure and a long stroke are required, for example in constructing membrane pistons, such as high pressure pumps for gases and liquids, pressure pistons for hydraulic presses and lifting arrangements or for gripping any work piece under a high and equal pressure on all sides, but also for any other purposes such as valve gaskets and dashpots in quick closing valves, furthermore, if necessary, in connection with elastic counter-pressure agents, a replacement for air chambers, a safety device for pipe lines and vessels, elastic bodies (compensators) in pipe lines, and for general purposes of tightening, transmitting pressure, elastic suspension or compensating and damping.

The membrane of the present invention is a bellows membrane which consists of a number of membrane discs, seamlessly connected together in series so as to be movable to and from each other; they may be suitably undulated or corrugated. Each of these membrane discs is supported on the face subjected to lower pressure by a number of sector shaped plates mounted in two groups of movable co-axial rings, one group being arranged at the inner ends, the other group being arranged at the outer ends of the sector-shaped plates in such a manner that each ring carries the ends of two adjacent series of supporting plates. The mounting rings of one group may consist of several parts which are held together by a closed ring in order to facilitate dismounting and cleaning.

If the membrane discs are undulated, the supporting plates are preferably correspondingly corrugated. Alternatively, between the membrane discs and the supporting plates there may also be interposed rings whose form corresponds with the undulations of the membrane.

This construction affords a bellows membrane of long stroke and capable of withstanding high pressure without bursting. The two end membranes are secured by further plates or in case of membrane pistons by the wall of the casing or the piston. A membrane piston of this kind has considerable radial play and a long stroke within a guide cylinder (casing) which limits the stroke and renders possible a reciprocal displacement of a pressure fluid and a corresponding device. Furthermore the construction facilitates rapid erection and dismantling of the membrane piston.

As the movable parts which receive the high pressure consist of sector shaped plates arranged in a series and placed with the necessary play in the mounting rings, these plates reciprocally support themselves with the membrane walls, which are also movable, in such a manner that they are relieved from axial pressure. The inner mounting rings are suitably made in one piece while the outer mounting rings consist of several parts for the purpose of easy assembly in the periphery and are held together by external clamping rings; alternatively the outer mounting rings may be in one piece while the inner mounting rings consist of several parts which are held together by a ring. In this construction threaded parts and the like are avoided if possible in order to save space and essentially to simplify the assembly. In this case the membrane serves only for the tightening of the pump chamber. In the case of membrane pistons the piston may be constructed, for instance in such a manner that the completely assembled membrane piston is introduced into the casing (cylinder) and that the end mounting ring is held against the bottom of the casing by the cover of the casing acting through an interposed distance piece.

The stroke may be further elongated by maintaining either the inner or the outer rings variable in their circumference. This may be carried out, for instance in such a manner that the rings are made in several circumferential parts the distance of which is variable from one another and which are held together by springs or holding rings acting as springs. The construction is, however, in this case somewhat more complicated but the stroke may be multiplied. The condition, however, consists in that a membrane of an especially elastic material, for instance of leather, caoutchouc, or of any special artificial substance is used. As during the expansion of the rings the distance of the ring parts and in these places also of the supporting plates from each other increases, these distances must be bridged over by suitable, movably arranged plates in order to effectively support the membrane.

The operation of the membrane piston may be, for instance, as follows: The pressure fluid is conducted through a pipe, connected with the pressure chamber, into the pressure chamber and the piston rod slides out of the casing until the stroke is complete; the piston stroke may then be reversed by a corresponding reversal of the pressure fluid.

The invention is diagrammatically illustrated by way of example in the accompanying drawings in which Fig. 1 is half of a longitudinal section through a high pressure membrane piston with its casing;

Figure 1:
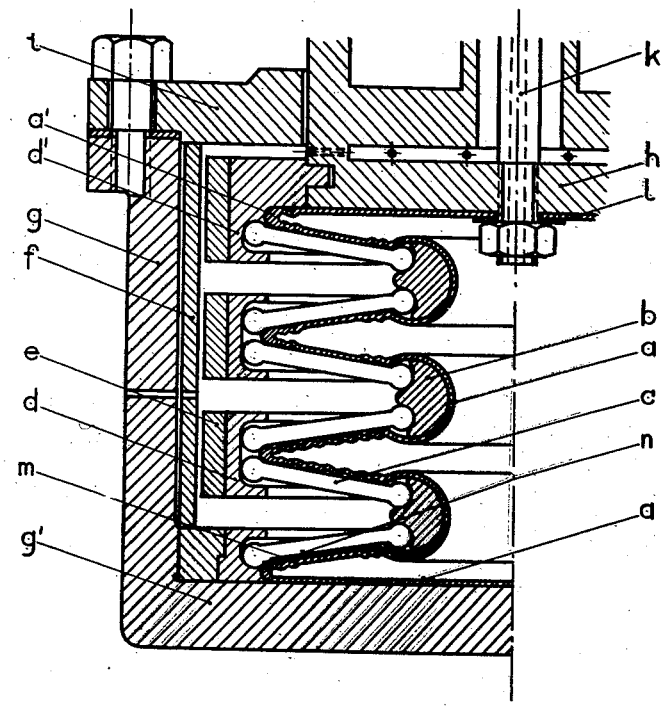

Fig. 1 shows the high pressure membrane piston nearly at the end of its stroke. $a$ is the membrane which has a reinforcement at $a'$. The supporting walls for the membrane $a$ are the sector shaped plates $c$, the inner mounting rings $b$, the bottom $g'$, of the casing and the wall of the piston head $h$. The outer mounting rings $d$ and $d'$, made in several circumferential parts are provided with holdings rings $e$. A reciprocal displacement is avoided by suitable safety devices (not illustrated in the drawings). The control gear of the piston $h$ is enclosed in the casing $g$. The piston head $h$ is connected with the piston neck. The lowest holding ring is held between the bottom $g'$ and the lid $i$ by a bushing $f$.

The pressure pipe $k$ leading into the pressure chamber is provided with a suitable joint $l$ which tightens the membrane $a$.

In order to cover the space between the various sector shaped plates $c$ and the transition of the plates $c$ to the mounting rings, steel plates $n$ or the like and in case of undulated membranes steel rings $m$ or the like may be placed below the membrane in order to avoid deformation of the soft membrane material when high pressures are applied or the bearing surfaces of the supporting plates are adapted to the undulated form of the membrane.

Figure 3:
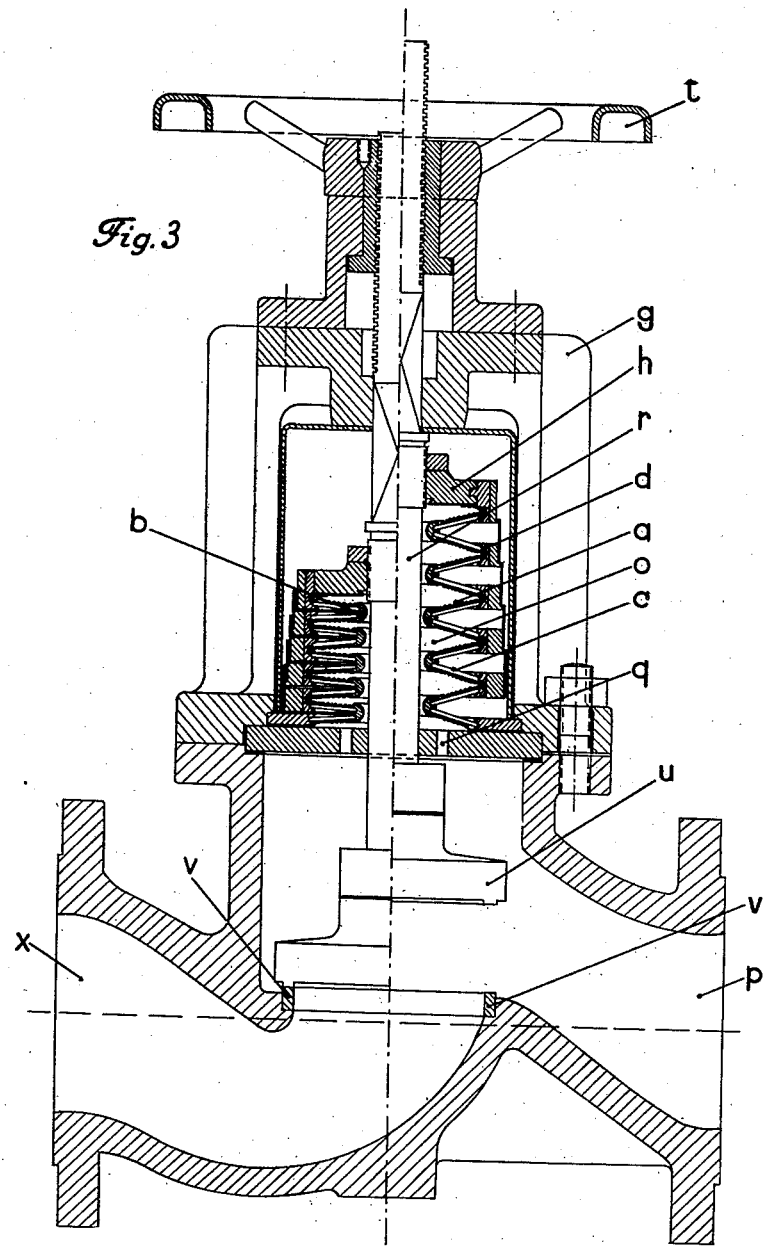
Fig. 3 shows the use of a membrane piston for a valve packing; the left hand side of this figure is a longitudinal section of the piston in the closed position and the right hand side in the open position.

In Fig. 3 $a$ is the undulated membrane which is supported by supporting plates $c$ which are placed in the inner mounting rings $b$ and the outer mounting rings $d$. The interior of the membrane piston $o$ is connected by canals $q$ with that part $p$ of the piping which shall be shut off. In the interior of the piston there moves a bar $r$ which is rigidly connected with the cover plate $h$; outside of the piston casing $g$ this bar is provided with a thread; by rotating the hand wheel $t$ on the thread the bar $r$ and the cover plate $u$ connected with the bar can be lifted or lowered.

In the closed position of the valve the plate $u$ is strongly pressed against the tightening ring $v$ whereby the parts $p$ and $x$ of the piping are shut off from each other.

The valve thus described is suitable for the shutting off of pipings wherein a high pressure is present and at which pipings ordinary tightening arrangements such as stuffing boxes do not suffice. The movement of the shut off device, in the drawings the plate $u$, may also be performed in any other known manner, but the tightening by the membrane body according to my invention is essential in this case.

Figure 4:
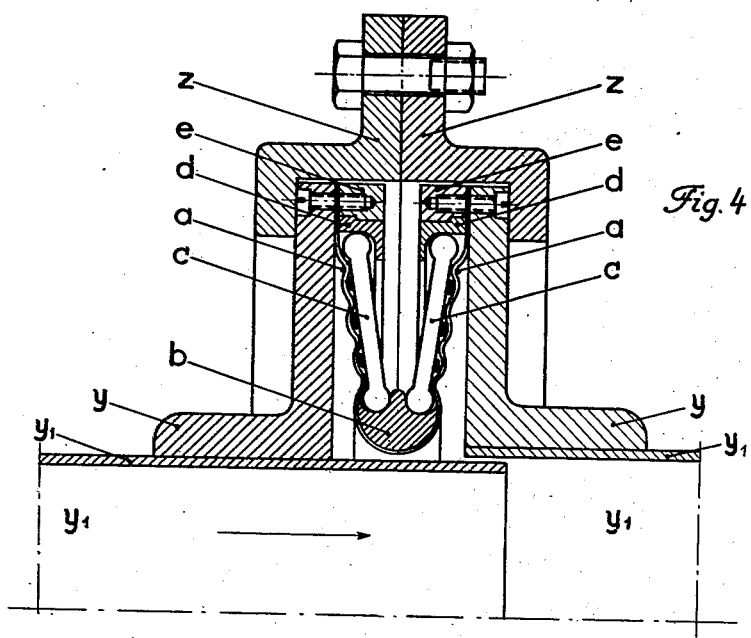
Fig. 4 shows the use of a membrane body as an elastic body (compensator) for a high pressure and a long extension power in case of a small total length of high pressure pipings.

In case of the pipe connection by a bellows membrane according to Fig. 4 $y$ are the flanges which are rigidly connected with the pipes $y'$. $b$ are the inner mounting rings, $d$ are the outer mounting rings, $c$ are the sector shaped supporting plates and $e$ the holding rings, which at the same time press the membrane $a$ by means of screws on the flanges $y$ and tighten the whole in this place. The distance rings $z$ connected with screws give the pipings $y'$ the necessary support in an axial or radial direction. These distance rings or the flanges $y$ themselves may also be elastically connected with each other whereby the tube pieces are always contracted again.

Figure 2:
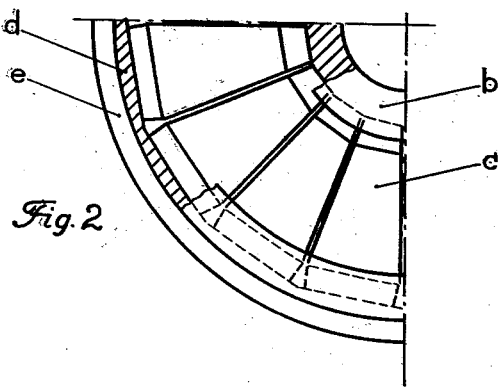
Fig. 2 is the fourth part of a cross-section through the piston.
Figure 5:
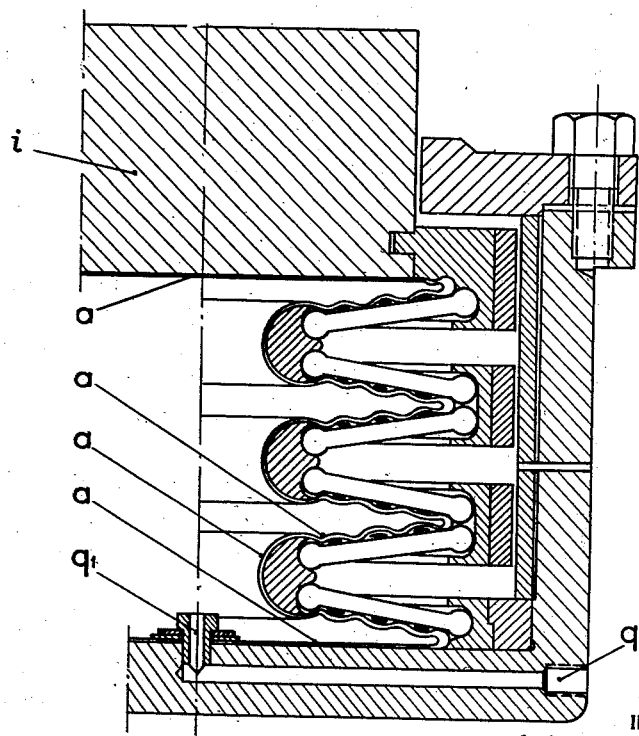
Fig. 5 is a membrane piston as pressure piston for a lifting device.

In Fig. 5 $i'$ is the pressure piston of the lifting arrangement, $q'$ the connection for the pressure agent and $a$ the arrangement of the membrane; the arrangement is the same as shown in Figs. 1 and 2.

I claim:

1. Bellows membrane and bellows membrane body for a high pressure and a long stroke comprising a number of annular membrane discs connected seamlessly in series with each other so as to be capable of moving to and from each other, a number of sector shaped plates by which the membrane discs are supported on the face subject to the lower pressure, and movable mounting rings on both sides of the sector shaped plates in which mounting rings the ends of two adjacent series of supporting plates are flexibly arranged together.

2. Bellows membrane and bellows membrane body for a high pressure and a long stroke comprising a number of annular membrane discs connected seamlessly in series with each other so as to be capable of moving to and from each other, a number of sector shaped plates by which the membrane discs are supported on the face subject to the lower pressure, and two groups of movable mounting rings one group being arranged at the inner ends, the other group being arranged at the outer ends of the sector shaped plates in which mounting rings the ends of two adjacent series of supporting plates are flexibly arranged together, the rings of one group each consisting of several pieces which are held together by a closed ring.

3. Bellows membrane and bellows membrane body for a high pressure and a long stroke comprising a number of annular membrane discs connected seamlessly in series with each other so as to be capable of moving to and from each other, a number of sector shaped plates by which the membrane discs are supported on the face subject to the lower pressure, and two groups of movable mounting rings one group being arranged at the inner ends, the other group being arranged at the outer ends of the sector shaped plates in which mounting rings the ends of two adjacent series of supporting plates are flexibly arranged together, the rings of one group each consisting of several pieces, the distances of which are variable o; each other and which distances and the distances of the supporting plates in the adjacent places are bridged by movably arranged plates.

4. Bellows membrane and bellows membrane body for a high pressure and a long stroke comprising a number of annular membrane discs connected seamlessly in series with each other so as to be capable of moving to and from each other, a number of sector shaped plates by which the membrane discs are supported on the face subject to the lower pressure, and two groups of movable mounting rings one group being arranged at the inner ends, the other group being arranged at the outer ends of the sector shaped plates in which mounting rings the ends of two adjacent series of supporting plates are flexibly arranged together, the rings of one group each consisting of several pieces, the distances of which are variable from each other and which distances and the distances of the supporting plates in the adjacent places are bridged by movably arranged plates while the pieces are held together by springs or elastic holding rings.

5. Bellows membrane and bellows membrane body for a high pressure and a long stroke comprising a number of annular undulated membrane discs connected seamlessly in series with each other so as to be capable of moving to and from each other, a number of sector shaped plates undulated on the face carrying the membrane discs by which undulated plates the membrane discs are supported on the face subject to the lower pressure, and two groups of movable mounting rings one group being arranged at the inner ends, the other group being arranged at the outer ends of the sector shaped plates in which mounting rings the ends of two adjacent series of supporting plates are flexibly arranged together.

6. Bellows membrane and bellows membrane body for a high pressure and a long stroke comprising a number of annular undulated membrane discs connected seamlessly in series with each other so as to be capable of moving to and from each other, a number of sector shaped plates by which the membrane discs are supported on the face subject to the lower pressure, and two groups of movable mounting rings one group being arranged at the inner ends, the other group being arranged at the outer ends of the sector shaped plates in which mounting rings the ends of two adjacent series of supporting plates are flexibly arranged together and intermediate rings the form of which is adapted to the undulations of the membrane discs and which support the undulations of the membrane discs against the supporting plates.

7. Bellows membrane body for a high pressure and a long stroke comprising a number of annular membrane discs connected seamlessly in series with each other so as to be capable of moving to and from each other, a number of sector shaped plates by which the membrane discs are supported on the face subject to the lower pressure, and two groups of movable mounting rings one group being arranged at the inner ends, the other group being arranged at the outer ends of the sector shaped plates in which mounting rings the ends of two adjacent series of supporting plates are flexibly arranged together, the bellows membrane body being secured on both sides by plates.

8. Bellows membrane body for a high pressure and a long stroke comprising a number of annular membrane discs connected seamlessly in series with each other so as to be capable of moving to and from each other, a number of sector shaped plates by which the membrane discs are supported on the face subject to the lower pressure, and two groups of movable mounting rings one group being arranged at the inner ends, the other group being arranged at the outer ends of the sector shaped plates in which mounting rings the ends of two adjacent series of supporting plates are flexibly arranged together, a casing surrounding the bellows membrane body so as to secure it on the one side while on the other side it is secured by a plate.

9. The use of bellows membrane and bellows membrane bodies for a high pressure and a long stroke comprising a number of annular membrane discs connected seamlessly in series with each other so as to be capable of moving to and from each other, a number of sector shaped plates by which the membrane discs are supported on the face subject to the lower pressure, and two groups of movable mounting rings one group being arranged at the inner ends, the other group being arranged at the outer ends of the sector shaped plates in which mounting rings the ends of two adjacent series of supporting plates are flexibly arranged together for any purposes of transmitting pressure.

10. For use in packing devices bellows membrane and bellows membrane bodies for a high pressure and a long stroke comprising a number of annular membrane discs connected seamlessly in series with each other so as to be capable of moving to and from each other, a number of sector shaped plates by which the membrane discs are supported on the face subject to the lower pressure, and two groups of movable mounting rings one group being arranged at the inner ends, the other group being arranged at the outer ends of the sector shaped plates in which mounting rings the ends of two adjacent series of supporting plates are flexibly arranged together.

11. For use in elastic suspension and dampening devices bellows membrane and bellows membrane bodies for a high pressure and a long stroke comprising a number of annular membrane discs connected seamlessly in series with each other so as to be capable of moving to and from each other, a number of sector shaped plates by which the membrane discs are supported on the face subject to the lower pressure, and two groups of movable mounting rings one group being arranged at the inner ends, the other group being arranged at the outer ends of the sector shaped plates in which mounting rings the ends of two adjacent series of supporting plates are flexibly arranged together.

ADOLF BRENDLIN.